Oct. 21, 1930.   H. SELL   1,778,985
ELECTRIC APPLIANCE FOR THE MEASURING OF THE ACUTENESS OF HEARING
Filed Aug. 23, 1928
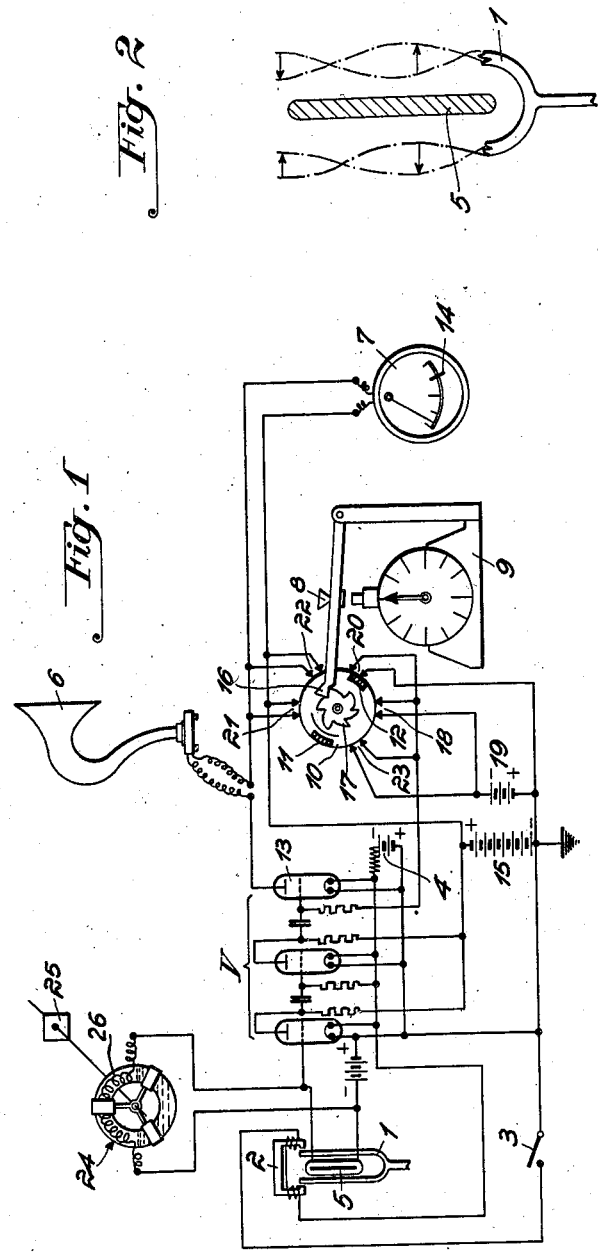
Inventor:
Helmut SELL
by Lotka, Kellenbeck & Farley
Attorneys.

Patented Oct. 21, 1930

1,778,985

UNITED STATES PATENT OFFICE

HELMUT SELL, OF BERLIN-SIEMENSSTADT, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

ELECTRIC APPLIANCE FOR THE MEASURING OF THE ACUTENESS OF HEARING

Application filed August 23, 1928, Serial No. 301,682, and in Germany September 1, 1927.

For the purpose of measuring the acuteness of hearing, it is necessary to have an appliance that makes it possible to produce within a large range of sound, pure sinusoidal sounds, the intensity of which is graduated down to the threshold of audibility. The appliances or apparatus proposed for this purpose hitherto are comparatively complicated if they fulfil all the requirements made upon them. It is especially difficult to eliminate all the superimposed sounds. This requirement however is absolutely necessary as the sensitiveness of the ear, beginning from the low sounds up to about 2000 vibrations per second, increases to an extraordinary degree so that in the case of the low sounds in regard to which the ear is comparatively non-sensitive, especially in pathological cases the threshold of excitation may be measured for the superimposed sound possibly present and not for the corresponding basic sound.

Because of this, electrical vibrating or oscillating circuits which are excited by means of amplifying valves can, in themselves, not bring about the desired results as low frequency logarithmic decrements appreciably smaller than 0.1 cannot be obtained even with coils without an iron core. The logarithmic decrement is defined as the natural logarithm of the number expressing the damping ratio of the vibrations. It is therefore necessary to make use of filter circuits which may be either electrical or mechanical. The necessity of employing filter circuits however requires a comparatively complicated arrangement.

The object of the invention is to provide a measuring instrument for the acuteness of hearing, by means of which the existing problems are solved in an extraordinarily simple manner. Starting from the necessity of producing pure sinusoidal vibrations a mechanical vibrator is according to the invention used for the purpose of producing sounds. It is possible to build mechanical vibrators which are sufficiently free from superimposed sounds. For the present purpose it is possible to fulfil the especially favourable conditions to be mentioned further on by the use of tuning forks. The direct employment of a mechanical vibrator is however not satisfactory because of the undefined and insufficient intensity and because of the rapid dying down of the vibration. Therefore the mechanical vibrators do not directly produce the sound utilized for the testing of hearing, but generally by means of their vibrations a corresponding alternating current which is by means of a distortion-free amplifier, amplified to the desired intensity. This alternating current actuates a telephone. This arrangement renders it possible to produce sounds of any desired intensity which die away at a sufficiently slow rate to enable the asymptotic portion of the dying out curve.

The measuring of the output intensity is preferably effected in such a manner that the last valve of the amplifying arrangements acts in the circuit as a rectifier. After the production of the corresponding vibration the vibrator is allowed to die down until the measuring instrument indicates a prescribed intensity chosen as the starting point, and is then switched over to its amplification. The intensity measurement at that threshold is then preferably effected by means of a stop watch.

As the decrement of the mechanical vibrator is extremely constant, especially as it is not in any way influenced by the energy transforming element owing to the loose coupling the delivered intensities are perfectly defined and can at any desired moment be directly read off on the stop watch suitably calibrated for intensity. In this manner the difficulty of measuring extraordinarily small quantities is obviated. It is of course necessary that telephone head phone, or loud speaker, should work independently of the amplitude, a requirement which is in the case of most telephones sufficiently fulfilled for the application in question. It is naturally also possible to measure the strength of sound on the telephone.

One of the essential features of the invention consists in the means for obviating superimposed sounds. It is a known fact, that tuning forks when roughly sounded, for instance by striking them with a hammer, easily give rise to strong superimposed sounds. It is also known that the superimposed sounds die out quicker than the basic vibrations.

According to the invention the mechanical vibrator is electro-magnetically sounded with low intensity. For this purpose an electro-magnet is preferably used the poles of which are on the outside of the tuning fork leg. This method of sounding is especially favourable for the avoidance of superimposed sounds because of the perfect symmetry and the avoidance of any clumsy mechanical touching of the fork. It is further very favourable, as above mentioned, if the forks for the generation of alternating currents are only employed within a range of very small amplitudes, a range which in the case of direct utilization of the vibrations would have to be excluded because of the low intensity. It is also of special importance that the magnet system induced by the vibrator should be so constructed that partial vibrations of the vibrator are neutralized in their effect upon the magnet system.

An embodiment of the measuring instrument is shown diagrammatically by way of example, in Figure 1. The vibrator consists of a tuning fork 1 which can be sounded by a two legged electro-magnet 2. The magnetic poles are opposite the outer faces of the legs of the fork. The magnet is energized by the current of the battery 4 by depressing the key 3. Between the legs of the fork a coil 5 with an iron core is arranged, wherein, when the fork 1 vibrates an alternating current is induced. The vibrator is shown in Figure 2 on an enlarged scale. The induced magnet system 5 is arranged between the fork and is provided with an elongated pole piece of such a size that it bridges a complete wave of the first superimposed tone of the fork, as is indicated by the dotted line. It is quite evident that in such an arrangement the effects of the tuning fork legs vibrating in opposite sense neutralizes each other, so that in this case the superimposed sound does not electrically appear. This compensation also exists to a sufficient extent for other superimposed sounds. The alternating current is amplified by a three stage valve amplifier V with capacity resistance coupling. The heating current of the valves is furnished by the battery 4 and the anode current by a battery 15. The amplified alternating current feeds a loud speaker 6 which is interposed in the anode circuit of the last valve conjointly with a measuring instrument 7.

The arrangement further comprises a contact disc 10 and the clockwork 9. By a quick depression of the key 3 the vibrator 1 is sounded. The grid potential of the last valve 13 is in the rest position of the device shown in Figure 1 earthed through a contact piece 12 of the contact disc 10 and the contact brushes 20 and is therefore at zero potential so that the valve acts as a rectifier. The measuring instrument 7 therefore shows a deflection which is a measure for the intensity of the alternating current induced in the coil 5. The measuring instrument is provided with an indicating mark 14 which corresponds to an intensity which is the output intensity chosen. In consequence of the gradual dying out of the vibrations of the vibrator 1 the hand or the instrument travels slowly over this point. At the moment when the hand is above the mark 14 a key 8 is depressed and thereby the stop watch 9 designed as an intensity measuring instrument is put in operation. By depressing the key the contact disc 10 is simultaneously by means of a pawl 16 and of a switching ratchet wheel 17 turned by the amount of one tooth in the direction of the arrow whereby a contact piece 11 is moved into the top position and short circuits the measuring instrument 7 through the contact brushes 21. Simultaneously the grid biasing potential of the last valve 13 is by means of the contact brushes 18 through the contact piece 12 switched from zero into a negative potential obtained by means of a battery 19 suitable for a distortionless amplification.

When the threshold of sensitivity of the person being tested, and listening to the loud speaker, is reached, the key 8 is again depressed and thereby the stop watch is stopped. The corresponding threshold intensity can then be directly read from the suitably calibrated scale or dial of the watch. The connections at the disc 10 and the contact pieces 11 and 12 are maintained by means of the brushes 22 and 23. When a new measurement is to be made, it is of course necessary to bring the stop watch into the zero position by again depressing the key 8. The contact disc 10 is then again in a position corresponding to its original position (except that the contact pieces 11 and 12 have changed their position) and only the pair of brushes 20 being in circuit. It will be understood that the loudspeaker 6 has been selected simply as a convenient example of an electric sound-producing device, or in other words, a device for converting electrical vibrations into sound waves.

It is appropriate to carry out the test for acuteness of hearing by means of intermittent sounds. By this method of interpolating the alternating current any crackling noise in the telephone is avoided. For this purpose a mercury switch 24 is arranged in parallel with the induced winding 5, and is moved by means of a clockwork 25 which periodically short circuits the winding 5 connected to a high resistance 26. This switch consists preferably of an annular tube or ring of insulating material wherein a platinum resistance 26 is lodged. The tube is filled about half way with mercury. When the ring is turned from the position illustrated the resistance 26 is gradually shunted out by the mercury until it is completely short circuited after the ring has been turned 180° from the position illustrated. The ring can, for the purpose of avoiding sliding contacts, execute a pendulum like motion which permits of the current being supplied through flexible conductors. The testing device may be worked by means of relays, which effect the individual operations and thus become completely automatic. Only one vibrator is shown in the drawing; but of course a plurality of differently tuned vibrators constitute a complete testing apparatus which can be actuated by different keys. It is possible to provide only one coil 5 which is then displaceably fixed and which can be coupled with the various vibrators according to the requirements.

Instead of the coil 5 a microphonic apparatus may be used as transmitter one electrode of which is influenced by the mechanical vibrator.

I claim:

1. An electrical apparatus for determining the sharpness of hearing, comprising a mechanical vibrator, means for sounding said vibrator, means for converting the mechanical vibrations of said vibrator into electrical vibrations, a vacuum-tube circuit on which said electrical vibrations are impressed, a switching device associated with said circuit, to produce either an amplifying or a rectifying effect according to the actuation of said switching device, an electrical measuring instrument operatively associated with said circuit when the latter has a rectifying effect, and an electric sound-producing device operatively associated with said circuit when the latter has been switched over to the amplifying effect.

2. An apparatus according to claim 1, in which the circuit includes a plurality of vacuum tubes, and in which the switching device is associated with the grid of one of said tubes to alter the biasing potential thereof.

3. An apparatus according to claim 1, in which the circuit includes a plurality of vacuum tubes having grids, and in which the switching device is associated with the grid of one of said tubes, to give such grid either a zero biasing potential, for rectification, or a negative biasing potential, for amplification.

4. An apparatus according to claim 1, in which the means for sounding the mechanical vibrator consists of an electromagnet for actuating said vibrator, a source of electricity for energizing said magnet, and a switching device for throwing said source of electricity into and out of operative relation to said magnet.

5. An apparatus according to claim 1, in which the means for converting the mechanical vibrations of the vibrator into electrical vibrations consists of a magnet system in which electrical vibrations are produced inductively by the motion of said vibrator.

6. An apparatus according to claim 1, in which the mechanical vibrator consists of a tuning fork, and in which the means for converting the mechanical vibrations into electrical ones consists of a coil located adjacent to said tuning fork so that the latter, by its vibrations, will induce varying electrical potentials in said coil.

7. An apparatus according to claim 1, in which the mechanical vibrator consists of a tuning fork, and in which the means for converting the mechanical vibrations into electrical ones consists of a magnet system in which electrical vibrations are produced inductively by the vibrations of said tuning fork, the electrical relation of such magnet system and tuning fork being such as to obtain a practical neutralization of the effect of mechanical superimposed vibrations on said magnet system, so that the latter will be affected practically only by the basic or fundamental vibrations of said tuning fork.

8. An apparatus according to claim 1, in which the means for converting the mechanical vibrations of the vibrator into electrical vibrations consists of a magnet system in which electrical vibrations are produced inductively by the motion of said vibrator, said magnet system having a pole piece formation of such length as to bridge at least one complete wave of the higher mechanical vibrations superimposed on the basic or fundamental vibrations of said mechanical vibrator.

9. An apparatus according to claim 1, in which auxiliary means are provided for periodically interrupting the electrical vibrations.

10. An apparatus according to claim 1, in which auxiliary means are provided for interrupting the electrical vibrations periodically, said auxiliary means including a resistance associated with the means for converting the mechanical vibrations into electrical ones.

11. An apparatus according to claim 1, in which auxiliary means are provided for interrupting the electrical vibrations periodically, said auxiliary means including a wire coil associated with the means for converting the mechanical vibrations into electrical ones, and a body of mercury for varying the effective resistance of said wire coil.

12. An apparatus according to claim 1, in which auxiliary means are provided for interrupting the electrical vibrations periodically, said auxiliary means including an insulating ring mounted to swing, a body of mercury filling said ring partly, and a wire coil swinging with said ring and adapted to dip more or less into said body of mercury as said ring swings, to vary the effective resistance of said coil, said coil being associated with the means for converting the mechanical vibrations into electrical ones.

13. An apparatus according to claim 1, in which the switching device is associated with a clockwork the dial of which is graduated according to sound intensities.

14. An apparatus according to claim 1, in which the switching device is associated with a clockwork of the stopwatch type, and in which a unitary actuating device is provided for operating said switching device and controlling the operation of said clockwork.

In testimony whereof I affix my signature.

HELMUT SELL.